United States Patent
Eekhoff et al.

(12) 
(10) Patent No.: US 6,758,648 B1
(45) Date of Patent: Jul. 6, 2004

(54) DEATHCARE APPARATUS FOR TRANSPORTING MULTIPLE CASKETS, COTS, STRETCHERS, CREMATION TRAYS OR THE LIKE

(75) Inventors: David L. Eekhoff, Sioux Center, IA (US); Joel D. Van Den Brink, Rock Rapids, IA (US)

(73) Assignee: Link Mfg., Ltd., Sioux Center, IA (US)

( * ) Notice: Subject to any disclaimer, the term of this patent is extended or adjusted under 35 U.S.C. 154(b) by 121 days.

(21) Appl. No.: 10/173,741

(22) Filed: Jun. 17, 2002

(51) Int. Cl.⁷ .................................................. B60P 1/02
(52) U.S. Cl. ........................................ 414/495; 414/679
(58) Field of Search ................................. 414/495, 540, 414/679

(56) References Cited

U.S. PATENT DOCUMENTS 5,328,320 A * 7/1994 Farrow et al. .............. 414/495
5,879,122 A * 3/1999 Voelzke ....................... 414/458
6,547,509 B1 * 4/2003 Edmo ........................ 414/639

OTHER PUBLICATIONS

Schematic of DD200 Double Deck system of Link Mfg., Ltd. of Sioux Center, Iowa.

* cited by examiner

Primary Examiner—Khoi H. Tran
(74) Attorney, Agent, or Firm—Thomte, Mazour & Niebergall; Dennis L. Thomte

(57) ABSTRACT

A double-deck support suited for supporting and transporting multiple caskets, cots, stretchers, cremation trays or the like in a vehicle such as a van. A lower deck is secured to the floor of the vane and an upper deck is pivotally mounted above the lower deck and which may be moved between upper and lower positions with respect to the lower deck by means of a parallelogram-type connection controlled by electric actuators.

14 Claims, 6 Drawing Sheets

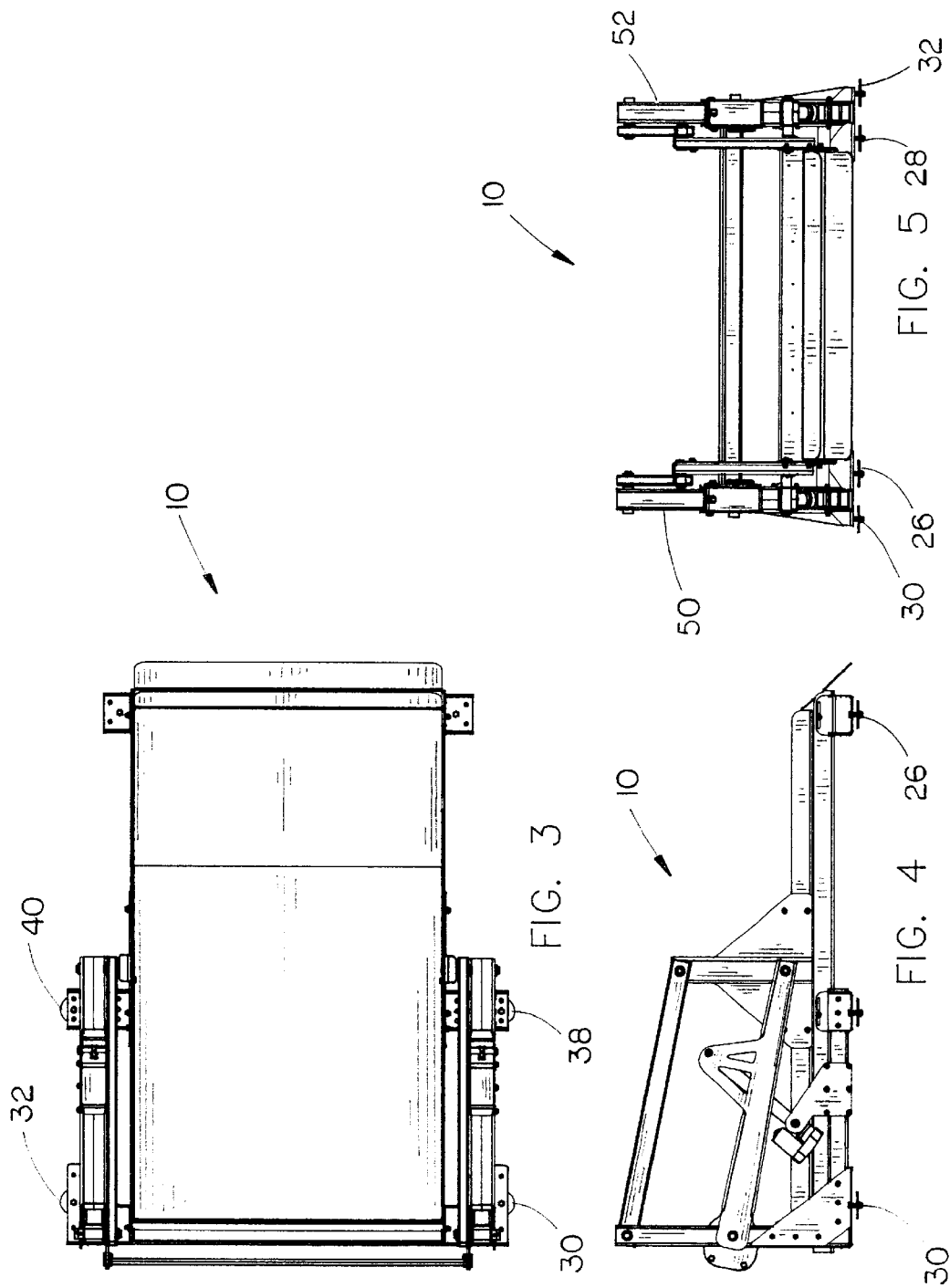

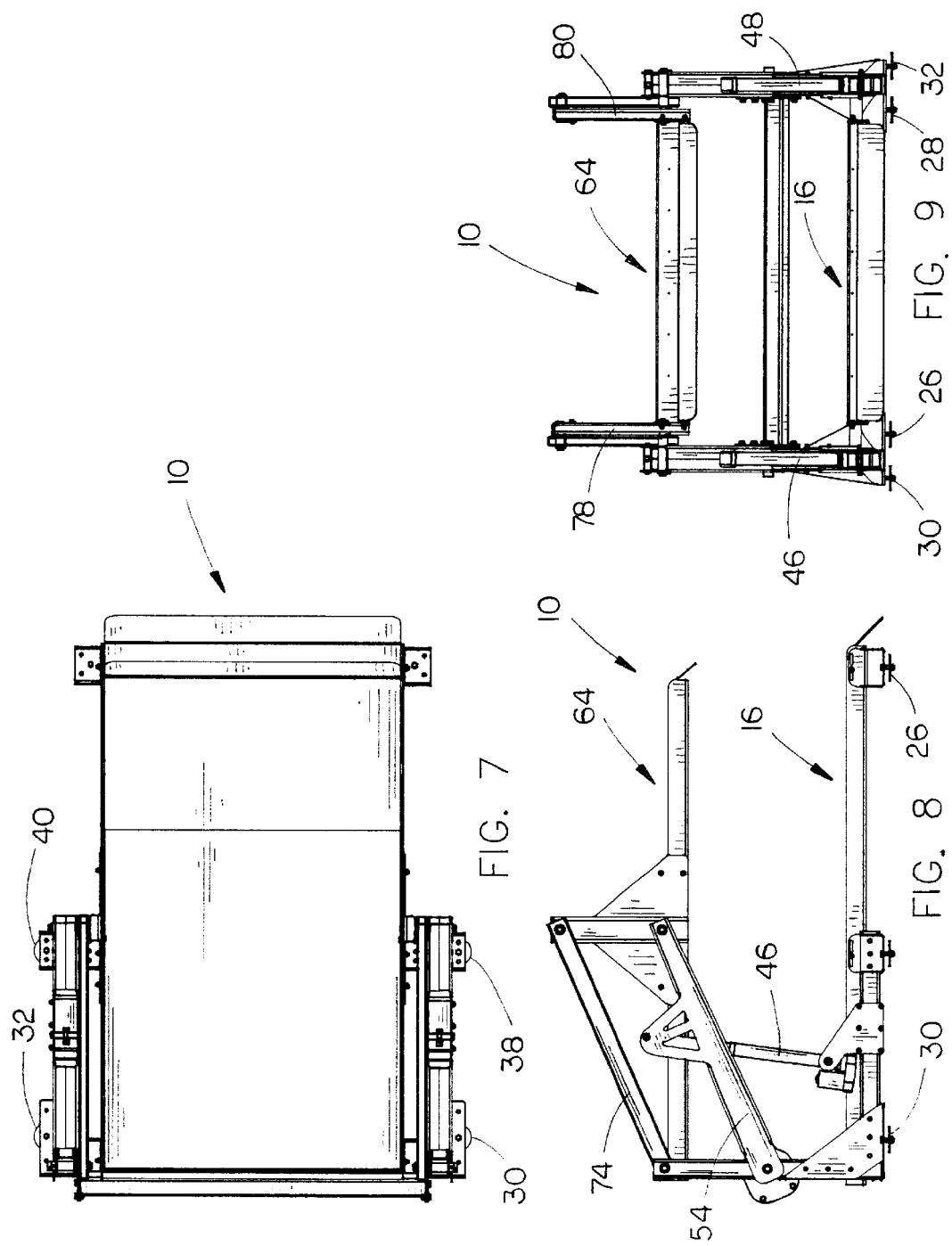

DEATHCARE APPARATUS FOR TRANSPORTING MULTIPLE CASKETS, COTS, STRETCHERS, CREMATION TRAYS OR THE LIKE

BACKGROUND OF THE INVENTION

1. Field of the Invention

This invention relates to a deathcare apparatus for transporting multiple caskets, cots, stretchers, cremation trays or the like in a van or other vehicle. More particularly, the instant invention relates to a double-deck apparatus including upper and lower decks with the upper deck being pivotally movable between upper and lower positions with respect to the lower deck so that both the upper and lower decks may support caskets, cots, stretchers, cremation trays or the like thereon.

2. Description of the Related Art

Link Mgf., Ltd. ("Link") of Sioux Center, Iowa, the assignee of this invention, has manufactured Double Deck deathcare apparatuses or systems which have been installed in full-size Chevrolet, Ford and Dodge vans with the Double Deck systems comprising a lower deck positioned on the floor of the van with an upper deck pivotally mounted thereon and which is movable between upper and lower positions with respect to the lower deck. The upper and lower decks are used to support and transport multiple caskets, cots, stretchers, cremation trays or the like. In the DD200 Double Deck system of Link, the upper deck is raised and lowered utilizing an electric actuator with that actuator moving a front torsion bar which lifts the front of the upper deck. In the DD200 Double Deck system of Link, there is a tie rod on each side, running from the front torsion bar to the rear swing arms with the rear swing arms lifting the rear of the upper deck.

Although the DD200 Double Deck system of Link has met with considerable success, the DD200 Double Deck system cannot be installed in certain vans which are smaller than the full-size vans described above. To satisfy that need, the instant invention is described which also includes an improved lifting system for the upper deck.

SUMMARY OF THE INVENTION

A deathcare apparatus for transporting multiple caskets, cots, stretchers, cremation trays or the like thereon is described for use in the cargo area of a van having a cargo floor. The apparatus of this invention comprises a lower deck which is secured to the vehicle cargo floor and which has a forward end, a rearward end, and opposite sides. A first support is secured to the lower deck at the forward end thereof adjacent one side thereof. A second support is secured to the lower deck at the forward end thereof adjacent the other side thereof. The apparatus also includes an upper deck which is positioned above the lower deck and which is movable between upper and lower positions with respect to the lower deck. A third support is secured to one side of the upper deck intermediate the forward and rearward ends thereof and a fourth support is secured to the other side of the upper deck intermediate the forward and rearward ends thereof. First and second lower lift arms are pivotally secured at their forward ends to the first and second supports and extend rearwardly therefrom. The forward ends of the lower lift arms are pivotally secured to the third and fourth supports adjacent the lower ends thereof. First and second lift arms are pivotally connected at their rearward ends to the upper ends of the first and second supports and are pivotally connected at their forward ends to the upper ends of the third and fourth supports, respectively. First and second actuators are pivotally connected to the first and second lower lift arms for raising and lowering the upper deck between its upper and lower positions. A torsion bar or member is secured to and extends between the forward ends of the first and second lift arms to stabilize the lifting operation.

A principal object of the invention is to provide an improved deathcare apparatus for transporting multiple caskets, cots, stretchers, cremation trays or the like in a vehicle such as a van.

A further object of the invention is to provide an improved apparatus of the type described above which is compact and which includes a minimum of moving parts.

Still another object of the invention is to provide an apparatus of the type described above which includes a torsion bar or member which extends between a pair of lower lift arms to stabilize the lifting operation.

Still another object of the invention is to provide an apparatus of the type described above including a pair of lower lift arms, each of which has an electric actuator secured thereto for raising and lower the lower lift arms.

These and other objects will be apparent to those skilled in the art.

BRIEF DESCRIPTION OF THE DRAWINGS

FIG. 3 is a top view of the apparatus of this invention;

FIG. 4 is a side view of the apparatus of this invention with the upper deck positioned in its lowermost position;

FIG. 5 is a rear view of the apparatus of this invention;

FIG. 7 is a top view of the apparatus of this invention with the upper deck in its raised position;

FIG. 8 is a side view of the apparatus of this invention with the upper deck in its upper position; and FIG. 9 is a rear view of the apparatus of this invention with the upper deck in its raised position.

DESCRIPTION OF THE PREFERRED EMBODIMENT

Figure 1A:
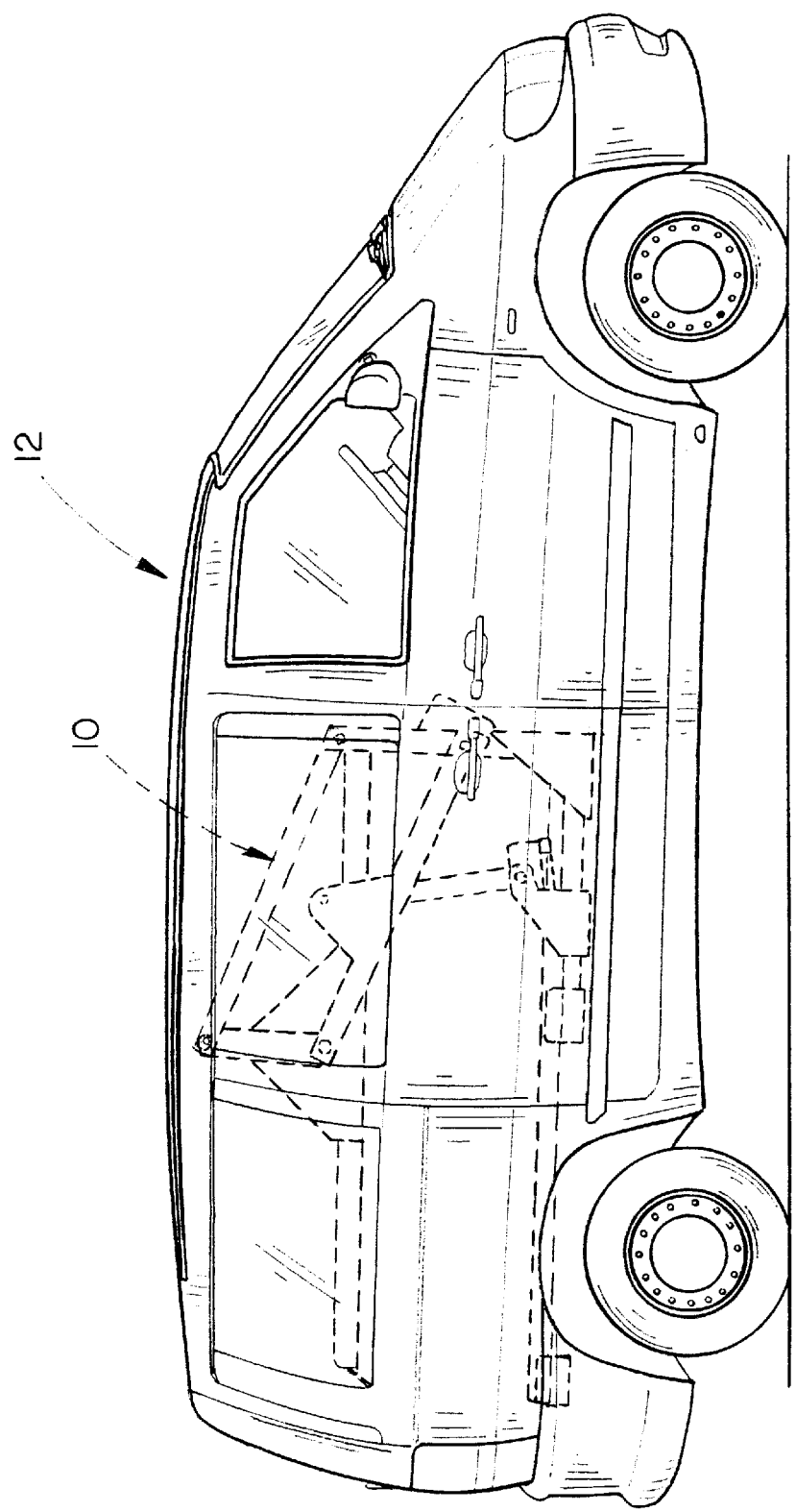
FIG. 1A is a side view of a vehicle having the apparatus of this invention mounted therein which is shown in broken lines.
Figure 1B:
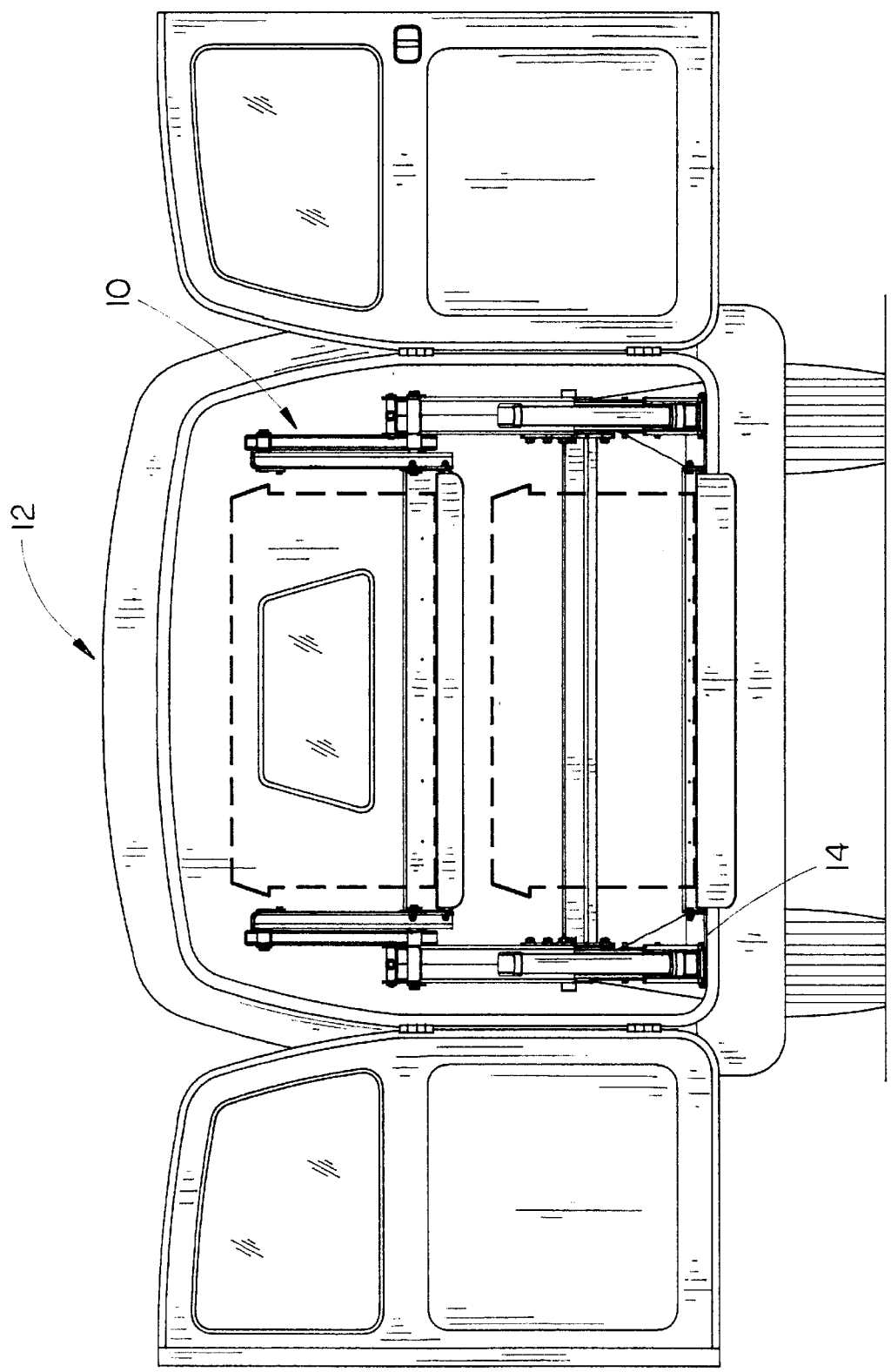
FIG. 1B is a rear view of the vehicle and the apparatus of this invention.

The apparatus of this invention is referred to generally by the reference numeral 10 which is adapted to be installed in the cargo area of a vehicle 12 including a cargo floor 14.

Figure 2:
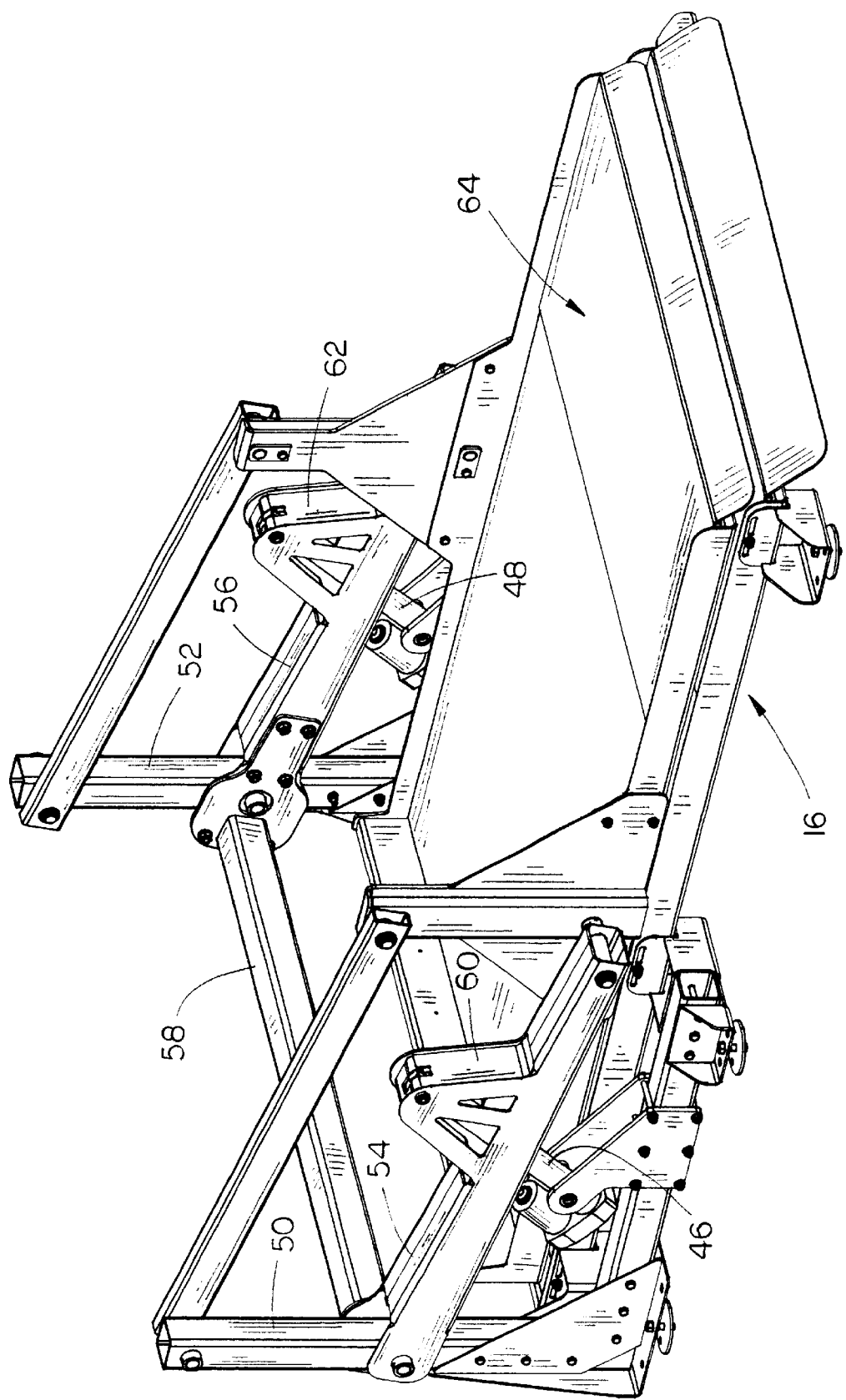
FIG. 2 is a rear perspective view of the apparatus of this invention.
Figure 6:
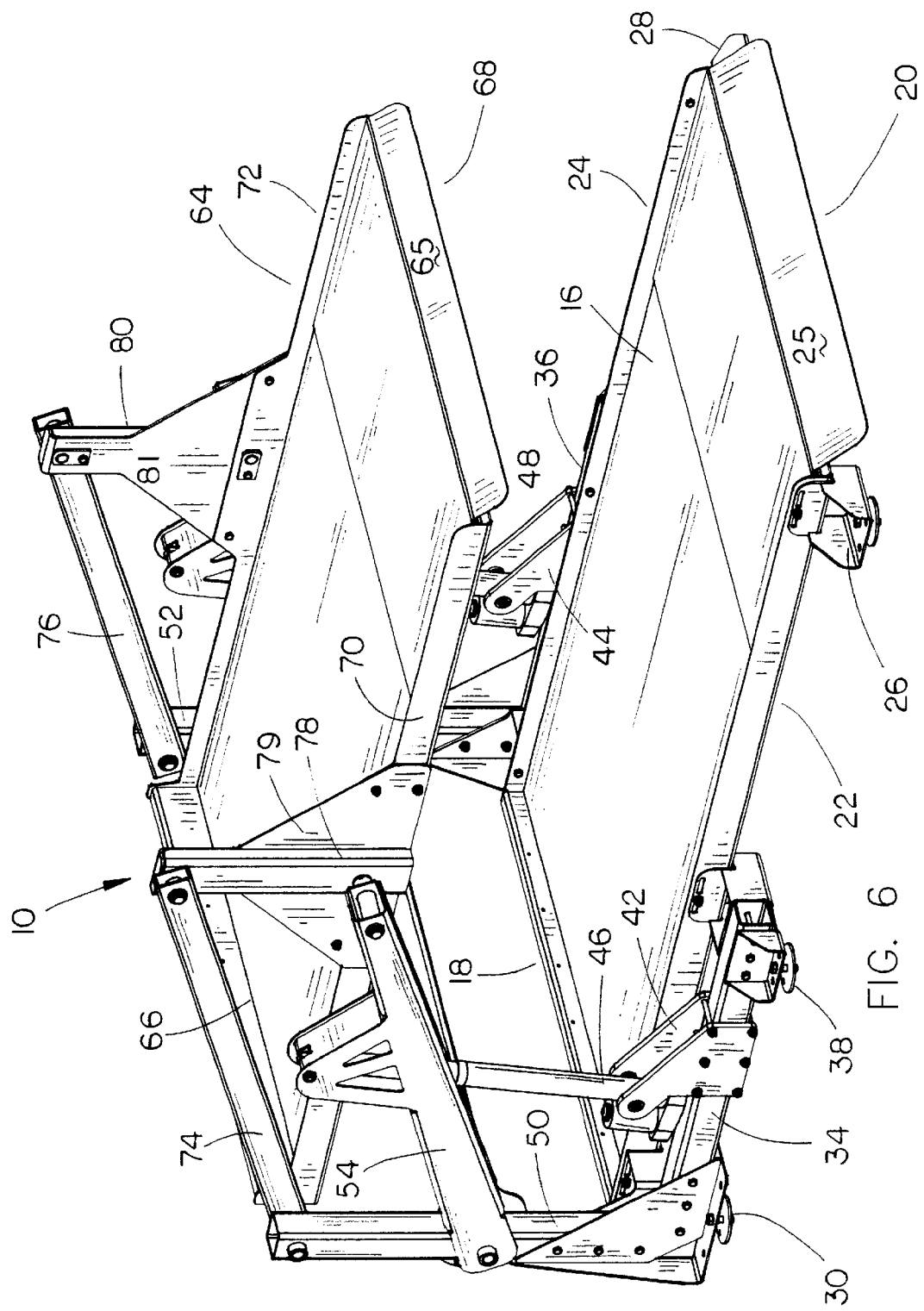
FIG. 6 is a rear perspective view of the apparatus of this invention with the upper deck raised to its upper position.

Apparatus 10 includes a lower deck 16 having a forward end 18, rearward end 20, and opposite sides 22, 24. As seen in FIGS. 2 and 6, the rearward end 20 of deck 16 extends downwardly and rearwardly to define a ramp 25 for facilitating the placement of deathcare items such as caskets, cots, stretchers, cremation trays or the like on deck 16. Mounting brackets 26 and 28 secure the rearward end of deck 16 to the cargo floor 14. Mounting brackets 30 and 32 are secured to the forward end of the deck 16 for further securing the deck 16 to the cargo floor 14. Elongated supports 34 and 36 are secured to brackets 30 and 32, respectively, and extend horizontally rearwardly therefrom laterally of sides 22 and 24 of deck 16, respectively. Mounting brackets 38 and 40 are secured to the forward ends of supports 34 and 36, respectively. Mounting brackets 38 and 40 are secured to the cargo floor 14 and to sides 22 and 24 of deck 16, respectively.

Actuator mounts 42 and 44 are mounted on supports 34 and 36, respectively, which have the lower ends of electric screw actuators 46 and 48 pivotally secured thereto, respectively. Posts 50 and 52 are secured to mounting brackets 30 and 32 and extend upwardly therefrom. Lower lift arms 54 and 56 are pivotally secured at their rearward ends to posts 50 and 52 above mounting brackets 30 and 32 and extend rearwardly therefrom. Torsion tube or member 58 is secured to the rearward ends of lower lift arms 54 and 56 and extends therebetween. Lower lift arms 54 and 56 are provided with generally inverted V-shaped pockets 60 and 62 which receive the upper ends of electric actuators 46 and 48 and which are pivotally connected thereto.

The numeral 64 refers to an upper deck having a forward end 66, rearward end 68 and opposite sides 70 and 72. The rearward end 20 of deck 64 extends downwardly and rearwardly to define a ramp 65 for facilitating the placement of deathcare items on deck 64 such as caskets, cots, stretchers, cremation trays or the like. Stabilizer or upper lift arms 74 and 76 have their forward ends pivotally connected at the upper ends of posts 50 and 52 and extend rearwardly therefrom. Upstanding supports 78 and 80 are secured to and extend upwardly from sides 70 and 72 of deck 64, respectively. As seen, supports 78 and 80 include gussets 79 and 81, respectively. The rearward ends of lower lift arms 54 and 56 are pivotally connected to supports 78 and 80 adjacent the lower ends thereof. The rearward ends of stabilizer arms 74 and 76 are pivotally connected to the upper ends of supports 78 and 80, as seen in the drawings. The pivotal connection of the lower lift arms 54 and 56 and the stabilizer arms 74 and 76 with the posts 50 and 52 and the pivotal connection of the lower lift arms 54 and 56 and the stabilizer arms 74 and 76 with the supports 78 and 80 forms a parallelogram-type lifting mechanism for the upper deck.

FIG. 2 illustrates the upper deck 64 in its lowered position with respect to lower deck 16. If the apparatus of this invention is not going to be used to support a large number of items thereon, the deck 64 may be left in its lowermost position with the deathcare items being positioned thereon. If the deathcare items cannot fit on the upper deck 64 in its lower position, as seen in FIG. 2, the electric actuators 46 and 48 are extended which causes the lower lift arms 54 and 56 to be pivotally moved upwardly from the position of FIG. 2 to the position of FIG. 6. The stabilizer arms 74 and 76, through their pivotal connection with the supports 78, 80 and the supports 50 and 52, respectively, causes the deck 64 to be raised to the upper position, as seen in FIG. 6, with the parallelogram structure causing the deck 64 to remain horizontal at all times during the lifting and lowering movements. The torsion bar 78 interconnects the forward ends of the lower lift arms 54 and 56 to assist in a smooth coordinated operation of the actuators 46 and 48.

When the apparatus 10 is in the position of FIG. 6, the deathcare items such as caskets, cots, stretchers, cremation trays, etc., may be positioned on both the lower deck 16 and the upper deck 64. The apparatus of this invention is extremely compact and has a minimum of moving parts.

Thus it can be seen that the invention accomplishes at least all of its stated objectives.

We claim:

1. In combination with a vehicle having an interior compartment above a floor, the vehicle having rearward and forward ends, comprising:

a lower deck mounted on the vehicle floor and having a forward end, a rearward end, and opposite sides;

a first upstanding support, having upper and lower ends, operatively secured to said lower deck at the forward end thereof adjacent one side thereof;

a second upstanding support, having upper and lower ends, operatively secured to said lower deck at the forward end thereof adjacent the other side thereof;

first and second lower lift arms, having forward and rearward ends, pivotally secured at their forward ends to said first and second upstanding supports, respectively, intermediate the upper and lower ends thereof and extending rearwardly therefrom;

an upper deck having a forward end, a rearward end, and opposite sides;

a third upstanding support, having upper and lower ends, secured at its lower end to one side of said upper deck intermediate the forward and rearward ends thereof;

a fourth upstanding support, having upper and lower ends, secured at its lower end to the other side of said upper deck intermediate the forward and rearward ends thereof;

a first stabilizer arm, having forward and rearward ends;

said forward end of said first stabilizer arm being pivotally secured to said first upstanding support and extending rearwardly therefrom above said first lower lift arm;

said rearward end of said first stabilizer arm being pivotally secured to said third upstanding support;

a second stabilizer arm, having forward and rearward ends;

said forward end of said second stabilizer arm being pivotally secured to said second upstanding support and extending rearwardly therefrom above said second lower lift arm;

said rearward end of said second stabilizer arm being pivotally secured to said fourth upstanding support;

said upper deck being pivotally movable between lower and upper positions with respect to said lower deck;

first and second actuators operatively connected to said first and second lower lift arms, respectively, for moving said upper deck between its said upper and lower positions.

2. The combination of claim 1 wherein said first and second actuators comprise electric actuators.

3. The combination of claim 1 wherein said lower lift arms and said stabilizer arms define a parallelogram life mechanism for said upper deck.

4. The combination of claim 1 wherein each of said lower lift arms have upstanding pockets provided therein and wherein said actuators are pivotally secured to said pockets.

5. The combination of claim 1 wherein a torsion bar is secured to and extends between said forward ends of said lower lift arms.

6. In combination with a vehicle having an interior compartment above a floor, the vehicle having rearward and forward ends, comprising:

a lower deck mounted on the vehicle floor and having a forward end, a rearward end, and opposite sides;

a first support extending upwardly from said lower deck at one side thereof and having upper and lower ends;

a second support extending upwardly from said lower deck at the other side thereof and having upper and lower ends;

first and second lower lift arms pivotally secured to said first and second supports and extending rearwardly therefrom;

an upper deck having a forward end, a rearward end, an opposite sides;

a third support extending upwardly from said upper deck at one side thereof;

a fourth support extending upwardly from said upper deck at the other side thereof;

a first stabilizer arm pivotally connected to and extending between said first and third supports above said first lower lift arm;

a second stabilizer arm pivotally connected to and extending between said second and fourth supports above and said second lower lift arm;

said first and second stabilizer arms being substantially parallel to said first and second lower lift arms, respectively;

said upper deck being selectively pivotally movable between upper and lower positions with respect to said lower deck.

7. The combination of claim 6 wherein first and second electric actuators are connected to said first and second lower lift arms, respectively, for pivotally moving said upper deck between its said upper and lower positions.

8. The combination of claim 6 wherein said first and second lower lift arms have forward and rearward ends and wherein said forward ends of said lower lift arms are pivotally connected to said first and second supports; and a torsion member secured to and extending between said rearward ends of said first and second lower lift arms.

9. The combination of claim 8 wherein said first and second lower lift arms are pivotally secured to said first and second supports above the lower ends thereof.

10. The combination of claim 9 wherein said first and second stabilizer arms are pivotally connected to said upper ends of said first and second supports.

11. The combination of claim 6 wherein each of said third and fourth supports includes a post, having upper and lower ends, said lower end of said post of said third support being secured to said one side of said upper deck, said lower end of said post of said fourth support being secured to said other side of said upper deck, said lower lift arms being pivotally connected to the posts of said third and fourth supports, respectively.

12. The combination of claim 11 wherein each of said third and fourth supports includes gusset plates secured to the posts thereof.

13. The combination of claim 6 wherein each of said lower lift arms includes a pivot connection which is positioned above the respective lift arm and wherein said electric actuators are pivotally connected to said pivot connections.

14. The combination of claim 7 wherein each of said electric actuators comprises a screw actuator.

* * * * *